US012672044B2

(12) United States Patent
Martin et al.

(10) Patent No.: US 12,672,044 B2
(45) Date of Patent: Jun. 30, 2026

(54) DEVICES, INFRASTRUCTURE EQUIPMENT AND METHODS FOR RELAY DEVICES

(71) Applicant: InterDigital Patent Holdings, Inc., Wilmington, DE (US)

(72) Inventors: Brian Alexander Martin, Basingstoke (GB); Vivek Sharma, Basingstoke (GB); Yuxin Wei, Basingstoke (GB); Anders Berggren, Lund (SE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 53 days.

(21) Appl. No.: 16/498,459

(22) PCT Filed: Feb. 28, 2018

(86) PCT No.: PCT/EP2018/054885
§ 371 (c)(1),
(2) Date: Sep. 27, 2019

(87) PCT Pub. No.: WO2018/177672
PCT Pub. Date: Oct. 4, 2018

(65) Prior Publication Data
US 2021/0112481 A1 Apr. 15, 2021

(30) Foreign Application Priority Data
Mar. 31, 2017 (EP) ..................................... 17164265

(51) Int. Cl.
*H04W 40/22* (2009.01)
*H04W 28/02* (2009.01)
(Continued)

(52) U.S. Cl.
CPC ....... *H04W 40/22* (2013.01); *H04W 28/0215* (2013.01); *H04W 28/0268* (2013.01); *H04W 48/10* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2005/0053003 A1* | 3/2005 | Cain | ....................... H04L 45/16 370/235 |
| 2008/0032697 A1* | 2/2008 | Sommer | ............... H04W 40/22 455/445 |

(Continued)

FOREIGN PATENT DOCUMENTS

| | | |
|---|---|---|
| CN | 104938023 A | 9/2015 |
| CN | 105474558 A | 4/2016 |

(Continued)

OTHER PUBLICATIONS

International Search Report and Written Opinion dated May 28, 2018 for PCT/EP2018/054885 filed on Feb. 28, 2018, 14 pages.
(Continued)

*Primary Examiner* — Andre Tacdiran
(74) *Attorney, Agent, or Firm* — Flaster Greenberg, P.C.

(57) ABSTRACT

A communications device acting as a relay device is configured to communicate with communications devices operating with a mobile communications network and infrastructure equipment. The relay device comprises transmitter circuitry, receiver circuitry and controller circuitry. The controller circuitry is configured to determine whether predetermined conditions relating to the setting of an indication bit have been met, wherein the indication bit indicates whether the relay device is able to form new connections with one or more of the communications devices, to set the indication bit dependent on the determination of whether the predetermined conditions have been met. The relay device is not able to form new connections with one or more of the
(Continued)

determining whether predetermined conditions relating to the setting of an indication bit have been met, wherein the indication bit indicates whether the communications device acting as the relay device is able to form new connections with one or more of the remote communications devices — 51 setting the indication bit dependent on the determination of whether the predetermined conditions have been met, wherein the communications device acting as the relay device is not able to form new connections with one or more of the remote communications devices when the predetermined conditions are met — 52 broadcasting the indication bit — 54 communications devices when the predetermined conditions are met, and to broadcast the indication bit.

14 Claims, 3 Drawing Sheets

(51) Int. Cl.
  *H04W 48/10*        (2009.01)
  *H04W 88/04*        (2009.01)

(56)                References Cited

U.S. PATENT DOCUMENTS

| | | | | |
|---|---|---|---|---|
| 2009/0279463 A1* | 11/2009 | Kuliner | | H04W 84/18 |
| | | | | 370/311 |
| 2011/0235502 A1* | 9/2011 | Yamada | | H04W 76/18 |
| | | | | 370/217 |
| 2013/0040605 A1* | 2/2013 | Zhang | | H04W 48/10 |
| | | | | 455/411 |
| 2013/0065600 A1* | 3/2013 | Lim | | H04W 36/0066 |
| | | | | 455/450 |
| 2013/0310058 A1* | 11/2013 | Ibrahim | | H04W 72/541 |
| | | | | 455/450 |
| 2014/0161103 A1* | 6/2014 | Sirotkin | | H04W 36/0088 |
| | | | | 370/332 |
| 2014/0256322 A1* | 9/2014 | Zhou | | H04W 36/20 |
| | | | | 455/436 |
| 2014/0370890 A1* | 12/2014 | Huang | | H04W 48/16 |
| | | | | 455/434 |
| 2015/0038136 A1 | 2/2015 | Wu et al. | | |
| 2015/0156676 A1* | 6/2015 | Yoon | | H04W 36/305 |
| | | | | 370/315 |
| 2015/0358067 A1* | 12/2015 | Zhang | | H04W 84/047 |
| | | | | 370/315 |
| 2016/0037568 A1* | 2/2016 | Hakola | | H04W 72/085 |
| | | | | 370/329 |
| 2016/0044613 A1* | 2/2016 | Cai | | H04W 88/04 |
| | | | | 370/315 |
| 2016/0135203 A1 | 5/2016 | Kim et al. | | |
| 2016/0192439 A1 | 6/2016 | Phuyal et al. | | |
| 2016/0204847 A1 | 7/2016 | Ryu et al. | | |
| 2016/0286471 A1 | 9/2016 | Zisimopoulos et al. | | |
| 2016/0337936 A1* | 11/2016 | Li | | H04W 8/005 |
| 2016/0353233 A1* | 12/2016 | Yong | | H04L 67/16 |
| 2017/0048906 A1* | 2/2017 | Lee | | H04W 76/14 |
| 2017/0093480 A1 | 3/2017 | Ijaz et al. | | |
| 2017/0181055 A1* | 6/2017 | Wong | | H04W 48/02 |
| 2017/0347338 A1* | 11/2017 | Chen | | H04W 76/14 |
| 2018/0084481 A1 | 3/2018 | Wang et al. | | |
| 2018/0115362 A1* | 4/2018 | Yasukawa | | H04W 40/22 |
| 2018/0199263 A1* | 7/2018 | Huang-Fu | | H04W 28/0289 |
| 2018/0220356 A1* | 8/2018 | Tenny | | H04B 7/15507 |
| 2018/0295534 A1* | 10/2018 | Huang | | H04W 76/15 |
| 2019/0150066 A1* | 5/2019 | Suzuki | | H04W 8/005 |
| | | | | 370/254 |
| 2019/0274017 A1* | 9/2019 | Wang | | H04L 12/1854 |
| 2019/0379450 A1* | 12/2019 | Kamei | | H04B 7/15542 |
| 2020/0045626 A1* | 2/2020 | Kim | | H04W 40/22 |

FOREIGN PATENT DOCUMENTS

| | | |
|---|---|---|
| CN | 106162511 A | 11/2016 |
| EP | 2946633 B1 | 3/2020 |
| WO | 2016/008657 A1 | 1/2016 |
| WO | 2016/161867 A1 | 10/2016 |
| WO | 2016/182597 A1 | 11/2016 |
| WO | 2016/184618 A1 | 11/2016 |

OTHER PUBLICATIONS

3GPP, "3rd Generation Partnership Project; Technical Specification Group Services and System Aspects; Study on extended architecture support for proximity-based services", Release 13, 3GPP TR 23.713 V13.0.0, Sep. 2015, pp. 1-80.

3GPP, "3rd Generation Partnership Project; Technical Specification Group Services and System Aspects; Service requirements for the Evolved Packet System (EPS)", Release 15, 3GPP TR 22.278 V15.1.0, Mar. 2017, pp. 1-49.

3GPP, "3rd Generation Partnership Project; Technical Specification Group Radio Access Network; Evolved Universal terrestrial Radio Access (E-UTRA); Radio Resource Control (RRC); Protocol Specification", Release 14, 3GPP TS 36.331 V14.2.0, Mar. 2017, pp. 1-721.

Qualcomm Incorporated, "New Work Item: NarrowBand IOT (NB-IOT)", 3GPP TSG RAN Meeting #69 RP-151621, Phoenix, USA, Sep. 14-16, 2015, 8 pages.

LG Electronics, Motivation for New SI "Enhancements of relayed Connection via WLAN and LTE Sidelink (ECO)", RP-160241, pp. 1-5.

China Telecom, "Discussion on UE Relay for eMBB and IoT", 3GPP TSG RAN Meeting No. 71 RP-160247, Göteborg, Sweden, Mar. 7-10, 2016, pp. 1-6.

Qualcomm, "Motivation for SI proposal on Further Enhancements to LTE Device to Device", RP-160268, pp. 1-10.

ZTE, "Motivation for new Work Item on D2D communication for commercial use cases", 3GPP TSG RAN Meeting No. 71 RP-160283, Goteborg, Sweden, Mar. 7-10, 2016, 8 pages.

Huawei et al., "L2 UE-to-Network Relay for E-UTRAN", 3GPP TSG-RAN #71 RP-160415, Göteborg, Sweden, Mar. 7-10, 2016, pp. 1-4.

Intel, "Motivation for SI: Further LTE D2D Enhancements for Wearables and MTC", 3GPP TSG RAN Meeting No. 71, RP-160427, Göteborg, Sweden, Mar. 7-10, 2016, pp. 1-13.

Qualcomm Incorporated et al., "New SI: Further Enhancements LTE Device to Device, UE to Network Relays for Wearables", 3GPP TSG RAN Meeting No. 71 RP-160677, Gothenburg, Sweden, Mar. 7-10, 2016, 7 pages.

Huawei et al., "Revised SI: Further Enhancements LTE Device to Device, UE to Network Relays for IoT and Wearables", 3GPP TSG RAN Meeting No. 73 RP-161839 revision of RP-161802, New Orleans, Sep. 19-22, 2016, 8 pages.

Interdigital et al., "Relay selection criteria", 3GPP TSG-SA WG1 Meeting No. 77 S1-171438 (revision of S1-170190, 1062, 1241), Jeju Island, South Korea, Feb. 13-17, 2017, 2 pages.

Interdigital et al., "Relay selection criteria", 3GPP TSG-SA WG1 Meeting No. 77 S1-171439 (revision of S1-171063), Jeju Island, South Korea, Feb. 13-17, 2017, 2 pages.

3GPP, "LTE; Evolved Universal Terrestrial Radio Access (E-UTRA); Radio Resource Control (RRC); Protocol Specification", 3GPP TS 36.331 Version 13.0.0, Release 13, pp. 1-669.

LG Electronics, "Solution on Relay for Public Safety ProSe", SA WG2 Meeting S2#98 S2-132614, Revision of S2-13XXXX, Jul. 15-19, 2013, Valencia, Spain, pp. 1-6.

Hard Holma and Antti Toskala, "LTE for UMTS—OFDMA and SC-FDMA Based radio Access", John Wiley & Sons, Ltd., 8 pages.

* cited by examiner eNB

201

202

205

RN

204

203

UE1

UE2

302

311

Relay UE
connected to eNB

303

305

312

301

Wearable device
connected via
narrowband link
to relay UE

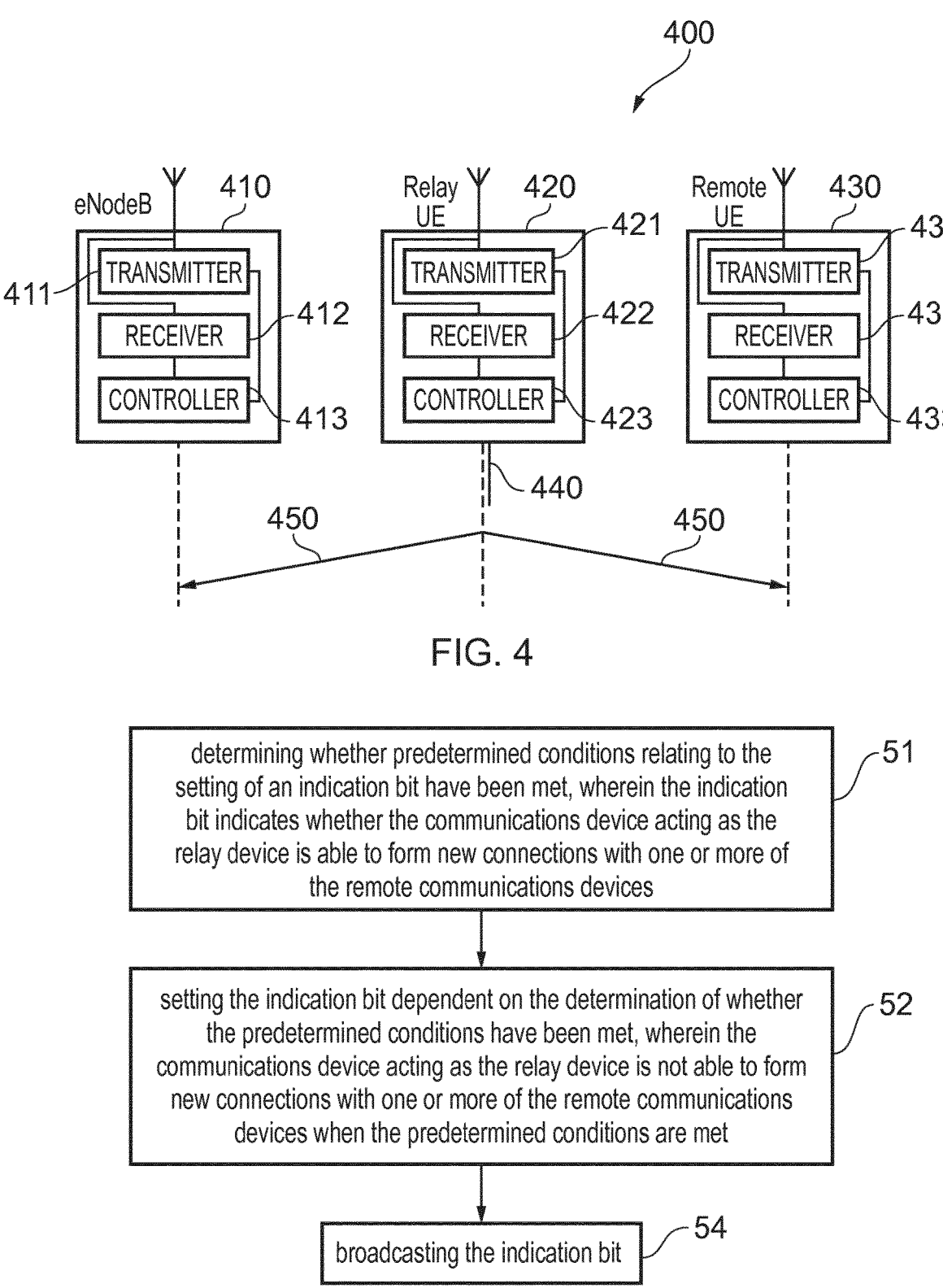

FIG. 4 determining whether predetermined conditions relating to the setting of an indication bit have been met, wherein the indication bit indicates whether the communications device acting as the relay device is able to form new connections with one or more of the remote communications devices — 51 setting the indication bit dependent on the determination of whether the predetermined conditions have been met, wherein the communications device acting as the relay device is not able to form new connections with one or more of the remote communications devices when the predetermined conditions are met — 52 broadcasting the indication bit — 54

FIG. 5

DEVICES, INFRASTRUCTURE EQUIPMENT AND METHODS FOR RELAY DEVICES

CROSS-REFERENCE TO RELATED APPLICATIONS

The present application is based on PCT filing PCT/EP2018/054885, filed Feb. 28, 2018, which claims priority to EP 17164265.5, filed Mar. 31, 2017, the entire contents of each are incorporated herein by reference.

BACKGROUND

Field of Disclosure

The present disclosure relates to communications devices acting as relay devices which are configured to relay signals between remote communications devices and infrastructure equipment in a mobile communications network. The present application claims the Paris convention priority to European patent application 17164265.5 the content of which are incorporated herein by reference.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Third and fourth generation wireless communications systems, such as those based on the third generation partnership project (3GPP) defined UMTS and Long Term Evolution (LTE) architecture are able to support sophisticated services such as instant messaging, video calls as well as high speed internet access. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks will need to support communications to and from a much wider range of devices, including reduced complexity devices, machine type communication (MTC) devices, wearable devices, devices which require little or no mobility, high resolution video displays and virtual reality headsets. As such, the supporting of such a wide range of communications devices, and the device-to-device (D2D) communications between them, can represent a technical challenge for a wireless communications network.

A current technical area of interest to those working in the field of wireless and mobile communications is known as "The Internet of Things" or IoT for short. The 3GPP has proposed to develop technologies for supporting narrow band (NB)-IoT using an LTE or 4G wireless access interface and wireless infrastructure. Such IoT devices are expected to be low complexity and inexpensive devices requiring infrequent communication of relatively low bandwidth data. It is also expected that there will be an extremely large number of IoT devices which would need to be supported in a cell of the wireless communications network. Furthermore such NB-IoT devices are likely to be deployed indoors and/or in remote locations making radio communications challenging. These challenges are also expected to be applicable to new generation wireless telecommunications systems, such as those implementing new Radio Access Technologies (RATs) such as 5th generation (5G) or New Radio (NR).

SUMMARY OF THE DISCLOSURE

The present disclosure can help address or mitigate at least some of the issues discussed above.

Respective aspects and features of the present disclosure are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein:

FIG. 4 is a part schematic representation, part message flow diagram of communications between a communications device acting as a relay node, an infrastructure equipment and a remote communications device in accordance with embodiments of the present technique; and FIG. 5 shows a flow diagram illustrating a method of operating a communications device acting as a relay node configured to communicate with infrastructure equipment and remote communications devices in accordance with embodiments of the present technique.

DETAILED DESCRIPTION OF THE EMBODIMENTS

Conventional Communications System and Relay Nodes

Figure 1:
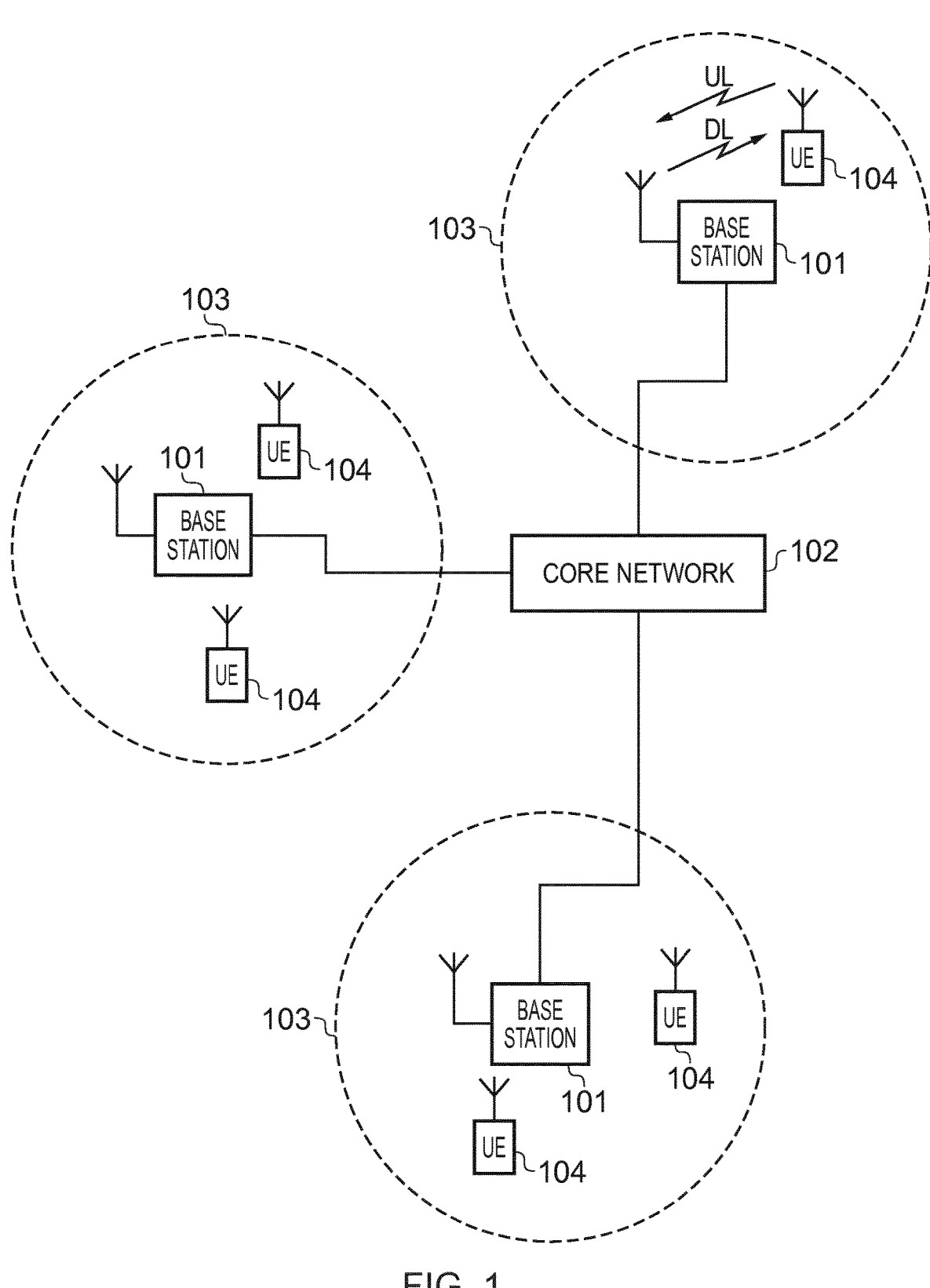
FIG. 1 is a schematic block diagram illustrating an example of a mobile telecommunication system.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on. Communications devices may also be referred to as mobile stations, user equipment (UE), user device, mobile radio, and so forth. Base stations may also be referred to as transceiver stations/infrastructure equipment/NodeBs/eNodeBs (eNB for short)/gNodeBs, and so forth.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

Mobile communications networks may further include relay nodes, to try to extend a radio coverage area provided by the network to reach communications devices which would otherwise be out of range of the mobile communications network or to improve the ratio of successful transmissions between a terminal and a base station. Relay nodes further allow power consumption at the terminal to be reduced, as the range of transmission for that terminal will be reduced. Other benefits of using devices as relay nodes include better network resource utilisation, because a short device to device communication range means that resources can be re-used in different regions of a cell, a shorter range potentially means less retransmissions or repetitions of data, and because a shorter range means less interference due to a lower transmit power. Communication devices configured to act as relay nodes may also reduce signalling overhead, because for example mobility related signalling procedures may be performed by the relay node on behalf of remote UEs connected to the relay, rather than being performed by each individual device. The relay node functionality allows a remote device to be identifiable and addressable by the mobile network operator, allows operator control of quality of service, and provides end-to-end security, providing advantages over traditional tethering which is already possible for example by use of Bluetooth.

Figures 2, 3:
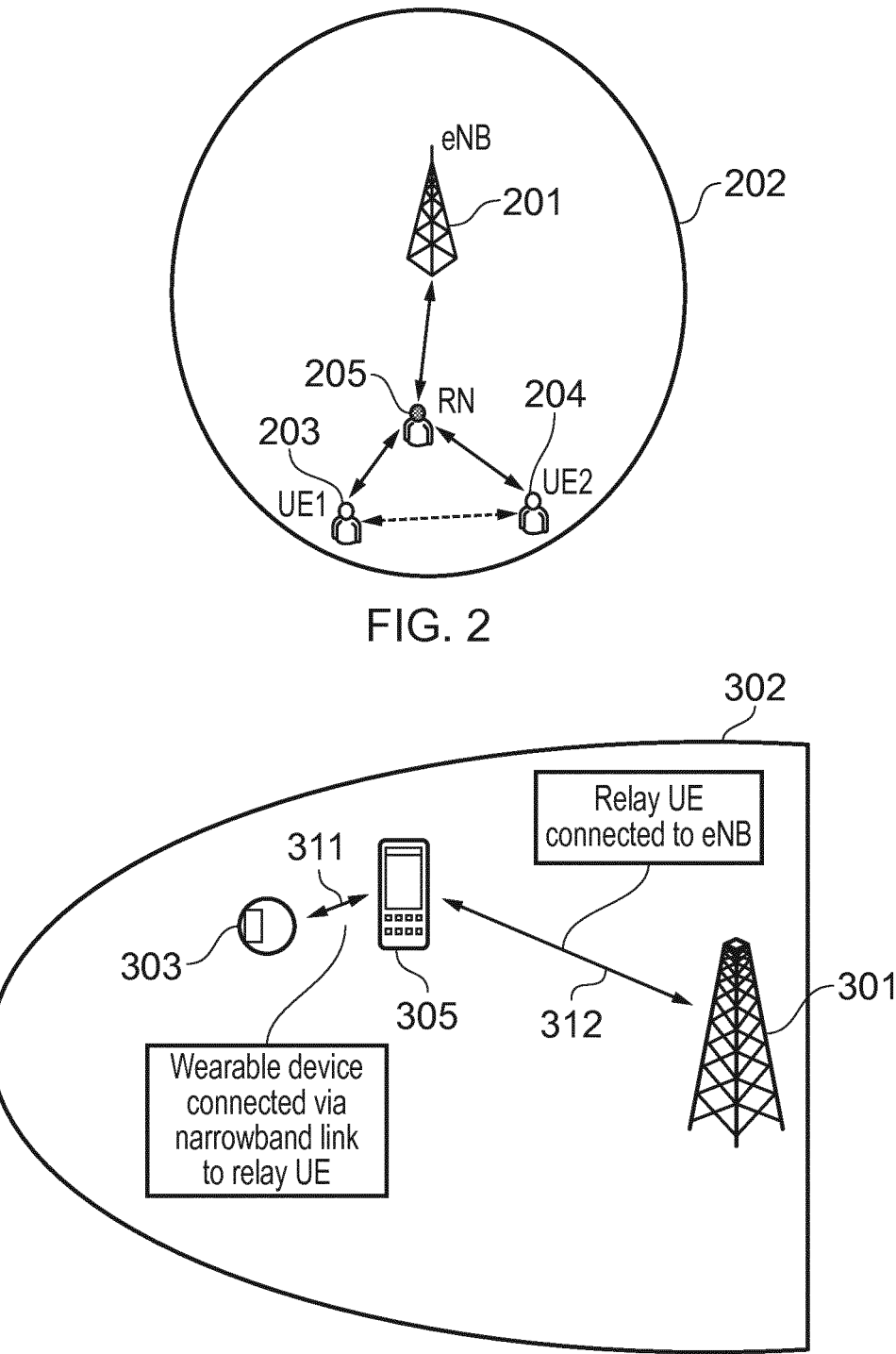
FIG. 2 illustrates an example of D2D communications using a relay node.
FIG. 3 illustrates an example scenario in which a remote wearable device may communicate with an eNodeB using a communications device as a relay node.

FIG. 2 illustrates an example network comprising an eNodeB 201 with a coverage area 202. Two UEs 203 and 204 may communicate with one another using device-to-device (D2D) communications. To communicate with the eNodeB 201, each of the UEs 203 and 204 communicate with a relay node 205, which then relays signals to and from the eNodeB 201. In the example of FIG. 2, both UEs 203 and 204 are inside the coverage area 202 of the eNodeB 201, so signals are not necessarily being relayed for coverage purposes. For example, the UEs 203 and 204 may be low power devices, and so communicating with the relay node 205 consumes less power (as communications are over a shorter range) than communicating directly with the eNodeB 201 would do.

A relay node can generally be defined as a wireless radio access point for relaying transmission and which thus does not implement all of the functionalities of a base station. It is in general not directly connected to the core network but uses wireless access (inband or outband) for backhaul link to connect with a base station.

Relay technologies (such as a communication device configured to act as a relay) are known generally to provide an arrangement for receiving signals from a base station and for retransmitting the received signals to a UE in a mobile communications network, or to receive signals transmitted from a UE for re-transmission to a base station of a mobile communications network.

Relay technologies (such as a communication device configured to act as a relay) are known generally to provide an arrangement for receiving signals from a base station and for retransmitting the received signals to a UE in a mobile communications network, or to receive signals transmitted from a UE for re-transmission to a base station of a mobile communications network.

Narrowband Internet of Things and Machine Type Communications

In 3GPP a project relating to improvements to LTE wireless access interfaces to provide for a Narrowband Internet of Things (NB-IoT) was agreed [2]. This project is aimed at improved indoor coverage, support for massive number of low throughput devices, low delay sensitivity, ultra-low device cost, low device power consumption and (optimised) network architecture. An example of such a device is a smart meter. It has been proposed that an NB-IoT communications system supports a bandwidth of only 180 kHz and can have three operational modes:

1. 'Stand-alone operation' utilising for example the spectrum currently being used by GERAN systems as a replacement of one or more GSM carriers
2. 'Guard band operation' utilising the unused resource blocks within a LTE carrier's guard-band
3. 'In-band operation' utilising resource blocks within a normal LTE carrier One of the objectives of NB-IoT is to allow the cost of devices to be as low as possible. This is also an objective of Low Complexity Machine Type Communication (LC-MTC). LC-MTC terminal devices (UEs) also implement new LTE features which are currently being specified in 3GPP. The main features of LC-MTC UE are low complexity (and therefore low cost), coverage enhancement and reduced power consumption.

Wearable devices (such as smartwatches and the like) are examples of devices which may make use of NB-IoT or LC-MTC communications systems. In 3GPP Rel. 14 a study item into further enhancements to LTE D2D communications, network relays for IoT and wearable devices has been approved [3], including the enhancement of D2D to be more suitable for lower cost/complexity (e.g. wearable) devices. The first phase of the study will evaluate scenarios and requirements with the intention of refining and updating current objectives. In addition to this, it has been agreed that relay technologies will form part of the future work on new radio access technology (RAT) for fifth generation (5G) wireless communication systems. It is anticipated that enhancements made to LTE D2D will also be applicable to these 5G systems.

Employment of Relay Nodes

One of the benefits of connecting indirectly to the network via a relay is that a remote device (e.g. a wearable device such as a smart watch) may reduce its power consumption, since uplink transmissions can be performed at a much shorter range to the relay device, rather than to the eNodeB. One potential realisation of this would be to utilise a narrowband channel similar to eMTC or NB-IoT for the relay link. This would be suitable for sending (and also potentially receiving) small amounts of data via the relay. Another possibility would be to use Bluetooth or Wi-Fi for the relay link (sidelink).

FIG. 3 illustrates an example scenario in which a remote wearable device 303 may communicate with an eNodeB 301 using a communications device 305 as a relay node. The eNodeB 301 has a coverage area 302, which the remote wearable device 303 and communications device 305 are within. The remote wearable device 303 is connected by a narrowband link 311 to the communications device 305, and the communications device is connected by a conventional link 312 to the eNodeB 301. The remote wearable device 303 may be, for example, a smartwatch, while the communications device 305 may be, for example a smartphone. The owner of the smartwatch may also own the smartphone, or alternatively, they may be owned by separate users.

As part of a 3GPP study item for Rel-15 [4], some of the concepts used in MTC and NB-IOT will be introduced for the D2D sidelink. Included in this is introduction of a limited bandwidth, for example 6 PRBs (Physical Resource Blocks)/1.4 MHz bandwidth sidelink similar to MTC. A UE with a limited receiver bandwidth (e.g. supporting LTE Cat-M) will also support a limited bandwidth for sidelink, in addition to direct link with the eNB.

As such it is not possible for this type of UE to monitor Uu (direct link) and PC5 (sidelink) simultaneously using the same receiver. In addition it is not possible to monitor more than 6 PRBs (in this example) on sidelink simultaneously.

In order to establish a PC5 connection between a remote UE 303 (e.g. limited bandwidth wearable device) and a relay UE 305 (e.g. Cat.1+ smartphone) the UEs must first perform a selection procedure and establish the PC5 connection. According to the current relay operation in Rel-13, the remote UE performs measurements on D2DSS (Device to Device Synchronisation Signal) transmitted by one or more relays, and once the criterion is met (e.g. RSRP (Reference Signal Received Power) or RSRQ (Reference Signal Received Quality) is above a threshold) then a relay may be selected, and a PC5 connection can be established to perform D2D (Device to Device) communication.

A radio resource pool is provided to the remote UE 303 to perform reception of various D2D signals. D2DSS, D2D discovery, and D2D sidelink data and control radio resource pools are provided. Due to the limited bandwidth of the remote UE 303, an efficient method for performing measurement, sync, discovery and communication is necessary.

Access Barring for Remote Devices Via Relay

In [5] and [6], certain requirements were agreed upon in relation to relay selection. It was determined that the 3GPP system shall support selection of an Evolved ProSe UE-to-Network Relay based on a combination of different criteria e.g.:

the subscriptions of Evolved ProSe UE-to-Network Relay and Evolved ProSe Remote UE,
    the capabilities of the Evolved ProSe UE-to-Network Relay,
    the QoS that is achievable by selecting the Evolved ProSe UE-to-Network Relay,
    the power consumption required by Evolved ProSe UE-to-Network Relay UE and Evolved ProSe Remote UE,
    the pre-paired Evolved ProSe UE-to-Network Relay,
    the 3GPP or non-3GPP access the Evolved ProSe UE-to-Network Relay uses to connect to the network, or the 3GPP PLMN the Evolved ProSe UE-to-Network Relay connects to.

Other criteria can play a role in selection of an Evolved ProSe UE-to-Network Relay. The 3GPP network shall be able to control Evolved ProSe UE-to-Network Relay selection either explicitly (e.g. by signalling) or implicitly (e.g. by provisioning of policies in the Evolved ProSe Remote UE and Evolved ProSe UE-to-Network Relay).

In addition SA1 agreed the requirements of which parameters are to be used for access class barring for a remote UE accessing the network via a relay.

A problem with these agreements is that any additional information that needs to be used by a remote UE for relay selection will have to be broadcast on the sidelink, hence increasing the overall resource overhead.

Embodiments of the present disclosure attempt to solve this problem. In such embodiments of the present technique, a single bit is broadcast by the relay UE to indicate whether it can accept new connections from remote UEs. The bit can be set for multiple different reasons, but is calculated in the relay UEs and so is hidden from any remote devices.

Currently, any D2D device transmitting a sidelink synchronisation signal (SLSS) sends some minimal system information, as defined in 3GPP TS 36.311 [7]. This technical specification defines the MasterInformationBlock-SL which includes the information transmitted by a UE transmitting SLSS, i.e. acting as synchronisation reference, via sidelink broadcast channel (SL-BCH). The MasterInformationBlock-SL includes a number of field descriptions, including:

directFrameNumber—Indicates the frame number in which SLSS and SL-BCH are transmitted. The subframe in the frame corresponding to directFrameNumber is indicated by directSubframeNumber;
    inCoverage—Value TRUE indicates that the UE transmitting the MasterInformationBlock-SL is in E-UTRAN coverage; and
    sl-Bandwidth—Parameter: transmission bandwidth configuration. n6 corresponds to 6 resource blocks, n15 to 15 resource blocks and so on.

Embodiments of the present technique may utilise one of the spare bits defined in this sidelink master information. Some embodiments of the present technique may utilise more than one of these spare bits.

The bit indicates to remote UEs attempting to select a relay, whether that relay can accept new connections from remote UEs. It should be noted that the relay may already be connected to one or more remote UEs, and therefore needs to broadcast the SLSS and this SL-MIB for those UEs.

The setting of the bit is entirely calculated by the relay device, and potentially some conditions are negotiated with the network, user setting (e.g. automatic connection allowed) or have well-defined rules in the specification.

FIG. 4 is a part schematic block diagram of a mobile communications system 400. The system comprises a communications device acting as a relay device 420, remote communications devices 430 operating with a mobile communications network and infrastructure equipment 410 forming part of the mobile communications network, and part message flow diagram illustrating a process of communications between the communications device acting as the relay device (relay node) 420, the remote communications devices 430 and infrastructure equipment 410 in accordance with embodiments of the present disclosure. Each of the relay node 420, remote communications devices 430 and infrastructure equipment 410 as shown in FIG. 4 comprise a transmitter (or transmitter circuitry) 421, 431, 411, a receiver (or receiver circuitry) 422, 432, 412 and a controller (or controller circuitry) 423, 433, 413 to control the transmitter 421, 431, 411 and receiver 422, 432, 412. Each of the 423, 433, 413 may be, for example, a microprocessor, a CPU, or a dedicated chipset, etc. It will be appreciated by those skilled in the art that, in arrangements of the present technique, the remote communications device/UE 430 may not always include a transmitter 431, for example in scenarios where the remote UE 430 is a low-power wearable device.

The transmitter 421 of the relay node 420 is configured in combination with the controller 423 of the relay node 420 to determine 440 whether predetermined conditions relating to the setting of an indication bit have been met, wherein the indication bit indicates whether the communications device acting as the relay device is able to form new connections with one or more of the remote communications devices, to set the indication bit dependent on the determination of whether the predetermined conditions have been met, wherein the communications device acting as the relay device is not able to form new connections with one or more of the remote communications devices when the predetermined conditions are met (i.e., when these conditions are met, the indication bit is set to indicate "barred") and to broadcast 450 the indication bit.

As stated above, the relay may already be connected to one or more remote UEs, and therefore needs to broadcast the SLSS and this SL-MIB for those UEs. In other words, the communications device acting as the relay device is configured to transmit, with the indication bit, one or more synchronisation signals to be used by communications devices to synchronise to the communications device acting as the relay device.

In embodiments of the present technique, conditions for setting the bit to indicate "barred" may include one or more of the following:

Relay UE battery level is low and therefore cannot accept more new connections. In other words, the predetermined conditions comprise a battery level of the communications device acting as the relay device being below a predetermined threshold.

Power consumption of accepting a new remote device is unacceptably high for the relay (this might be due to a combination of ongoing services, currently connected remote devices, and ongoing applications, for example). In other words, the predetermined conditions comprise an overall power consumption of the communications device acting as the relay device exceeding a predetermined threshold.

Relay already serves the maximum number of remote devices (this number might be a limit imposed by the standard, or it may be a user or device preference or this might be a limit based on the UE capability). In other words, the predetermined conditions comprise a number of the communications devices which are currently connected to the communications device acting as a relay device being equal to or more than a predetermined number.

Relay is using Uu link a for high throughput service and therefore cannot afford to share the resources with a remote device. This may be a limit defined by ability to provide the required Quality of service for each connected remote UE and the relay itself. In other words, the predetermined conditions comprise a quality of service that the communications device acting as the relay device is able to provide to the one or more of the communications devices is below a predetermined threshold.

Relay UE has performed an access class barring check on behalf of the remote UE using the parameters provided by the eNB, and no new remote UE is allowed to connect via the relay. In other words, the communications device acting as the relay device is configured to receive access class barring information, the access class barring information having been broadcast by one of the infrastructure equipment, and to perform an access class barring check on behalf of the one or more of the communications devices using the access class information, wherein the predetermined conditions comprise the communications device acting as the relay device determining that access is barred for the one or more of the communications devices. In some embodiments of the present technique, the communications devices are not necessarily barred for certain access classes, but are assigned a random number which must exceed a certain threshold for access to be granted to those access classes. This, in other words, results in a particular probability of the UEs being able to access. It may be determined that this probability is too low for the UE to even attempt to access. In other words, in such embodiments of the present technique the communications device acting as the relay device is configured to receive access class barring information, the access class barring information having been broadcast by one of the infrastructure equipment, and to perform an access class barring check on behalf of the one or more of the communications devices using the access class barring information, wherein the predetermined conditions comprise the communications device acting as the relay device determining that a probability of access being barred for the one or more of the communications devices for each access class potentially assigned to the one or more of the communications devices exceeds a predetermined threshold.

User setting configured such that only the users personal device(s) can connect (this means a manual connection would be used for personal devices, similar to e.g. Bluetooth pairing, and so a "pre-paired" device can connect, but no devices can automatically connect). This may be indicated using only the single indication bits, or one or more further bits may be used to define more complex access conditions. In other words, the indication bit indicates that the communications device acting as the relay device is only able to form new connections with communications devices which have been pre-configured to connect to the communications device acting as the relay device. Alternatively, the communications device acting as the relay device is configured to broadcast one or more further indication bits along with the indication bit, the one or more further indication bits defining an access condition under which the communications device acting as the relay device is able to form new connections with one or more of the communications devices, wherein the access condition comprises the one or more of the communications devices being devices which have been pre-configured to connect to the communications device acting as the relay device.

Only remote devices of a later release or of a particular type can connect. In this example the bit is always set to barred and a future release introduces an "override" bit understood only by higher capable UEs, or some types of UEs can ignore the barring bit and attempt to connect. This might be due to some critical new functionality introduced in a later release, or higher priority device or service, while allowing re-use of the existing SLSS. Again, this may be indicated using only the single indication bits, or one or more further bits may be used to define more complex access conditions. In other words, the indication bit indicates that the communications device acting as the relay device is only able to form new connections with communications devices of one or more predetermined types. Alternatively, the communications device acting as the relay device is configured to broadcast one or more further indication bits along with the indication bit, the one or more further indication bits defining an access condition under which the communications device acting as the relay device is able to form new connections with one or more of the communications devices, wherein the access condition comprises the one or more of the communications devices being devices of one or more predetermined types.

If the relay itself failed the access barring check when relay is in Idle mode or in connected mode UEs. In other words, the communications device acting as the relay device is configured to receive access class barring information, the access class barring information having been broadcast by one of the infrastructure equipment, and to perform an access class barring check using the access class barring information, wherein the communications device acting as the relay device is in an idle mode, and wherein the predetermined conditions comprise the communications device acting as the relay device determining that access is barred.

The network indicates to the relay to stop accepting new users. In other words, the predetermined conditions comprise the reception at the communications device acting as the relay device of an indication from one or more of the infrastructure equipment that the communications device acting as the relay device should not form new connections with one or more of the communications devices.

If the barred bit is set by relay itself, the relay may notify this to the network. Then the network may e.g. activate a new relay in addition if necessary. In other words, the infrastructure equipment is configured to transmit an activation indication to one of the other communications devices, the activation indication indicating that the one of the other communications devices should act as a relay device. In another example, the infrastructure equipment is configured to transmit to the communications device acting as the relay device an indication that the communications device acting as the relay device should not form new connections with one or more of the remote communications devices. In another example, when the UE is barred by the relay and alternatively selects the eNodeB for connection establishment, it may indicate e.g. in the RRC connection setup complete message that it is barred by relay. In other words, the communications device is configured to initiate a radio resource control connection establishment with one of the infrastructure equipment and may use this connection setup to provide feedback to the network regarding access barring. The communications device may then be configured to transmit a radio resource control connection setup complete message to the infrastructure equipment, the radio resource control connection setup complete message comprising an indication that the communications device is not able to form a new connection with the relay device.

When a remote UE receives this information in e.g. the SL-MIB then it shall not attempt to connect to the relay. However, already connected remote UEs shall continue to use the relay node. In other words, if the indication bit indicates that the communications device acting as the relay device is not able to form a new connection with the communications device, the communications device is configured to retain a pre-existing connection to the communications device acting as the relay device. Alternatively, the communications device may be configured to select another communications device which is currently acting as a relay device to form a new connection with. If the relay UE wants to stop the relay operation completely then it is already possible that the relay does not publish itself as a relay, so a single bit in SL-MIB should be sufficient.

FIG. 5 shows a flow diagram illustrating a method of operating a communications device acting as a relay device configured to communicate with communications devices operating with a mobile communications network and infrastructure equipment forming part of the mobile communications network. The method starts in step S, where it comprises determining whether predetermined conditions relating to the setting of an indication bit have been met, wherein the indication bit indicates whether the communications device acting as the relay device is able to form new connections with one or more of the communications devices. The process then comprises, in step S2, setting the indication bit dependent on the determination of whether the predetermined conditions have been met, wherein the communications device acting as the relay device is not able to form new connections with one or more of the communications devices when the predetermined conditions are met. The process concludes in step S4, which comprises broadcasting the indication bit.

Although the above described embodiments of the present technique deal primarily with the relaying of transmissions between an infrastructure equipment of a mobile communications network and a (communications) device (also referred to as a UE-to-network relay), it should be clear to those reading that embodiments of the present technique may also the D2D relaying of signals between two communications devices (also referred to as a UE-to-UE relay).

Those skilled in the art would appreciate that some of the "predetermined" conditions, thresholds, numbers, types and the like may be set in the specifications and as such hardwired into the various mobile communications devices. Alternatively, some of these "predetermined" conditions, thresholds, numbers, types and the like may be determined by the mobile communications network, and transmitted (i.e. from the infrastructure equipment) to the remote and relay communications devices.

Advantages of embodiments of the present technique include that it is possible to minimise the amount of information that needs to be broadcast over the D2D sidelink to inform communications devices whether access to relay nodes is barred.

The following numbered paragraphs provide further example aspects and features of the present technique:

Paragraph 1. A communications device acting as a relay device configured to communicate with communications devices operating with a mobile communications network and infrastructure equipment forming part of the mobile communications network, the communications device acting as the relay device comprising transmitter circuitry configured to transmit signals to the communications devices and to transmit signals to the infrastructure equipment, receiver circuitry configured to receive signals from the communications devices and to receive signals from the infrastructure equipment, and controller circuitry configured in combination with the transmitter circuitry to determine whether predetermined conditions relating to the setting of an indication bit have been met, wherein the indication bit indicates whether the communications device acting as the relay device is able to form new connections with one or more of the communications devices, to set the indication bit dependent on the determination of whether the predetermined conditions have been met, wherein the communications device acting as the relay device is not able to form new connections with one or more of the communications devices when the predetermined conditions are met, and to broadcast the indication bit.

Paragraph 2. A communications device acting as a relay device according to Paragraph 1, configured to transmit, with the indication bit, one or more synchronisation signals to be used by communications devices to synchronise to the communications device acting as the relay device.

Paragraph 3. A communications device acting as a relay device according to Paragraph 1 or Paragraph 2, wherein the predetermined conditions comprise a battery level of the communications device acting as the relay device being below a predetermined threshold.

Paragraph 4. A communications device acting as a relay device according to any of Paragraphs 1 to 3, wherein the predetermined conditions comprise an overall power consumption of the communications device acting as the relay device exceeding a predetermined threshold.

Paragraph 5. A communications device acting as a relay device according to any of Paragraphs 1 to 4, wherein the predetermined conditions comprise a number of the communications devices which are currently connected to the communications device acting as a relay device being equal to or more than a predetermined number.

Paragraph 6. A communications device acting as a relay device according to any of Paragraphs 1 to 5, wherein the predetermined conditions comprise a quality of service that the communications device acting as the relay device is able to provide to the one or more of the communications devices is below a predetermined threshold.

Paragraph 7. A communications device acting as a relay device according to any of Paragraphs 1 to 6, wherein the indication bit indicates that the communications device acting as the relay device is only able to form new connections with communications devices which have been pre-configured to connect to the communications device acting as the relay device.

Paragraph 8. A communications device acting as a relay device according to any of Paragraphs 1 to 7, wherein the indication bit indicates that the communications device acting as the relay device is only able to form new connections with communications devices of one or more predetermined types.

Paragraph 9. A communications device acting as a relay device according to any of Paragraphs 1 to 8, configured to broadcast one or more further indication bits along with the indication bit, the one or more further indication bits defining an access condition under which the communications device acting as the relay device is able to form new connections with one or more of the communications devices.

Paragraph 10. A communications device acting as a relay device according to Paragraph 9, wherein the access condition comprises the one or more communications devices being devices which have been pre-configured to connect to the communications device acting as the relay device.

Paragraph 11. A communications device acting as a relay device according to Paragraph 9 or Paragraph 10, wherein the access condition comprises the one or more communications devices being devices of one or more predetermined types.

Paragraph 12. A communications device acting as a relay device according to any of Paragraphs 1 to 11, configured to receive access class barring information, the access class barring information having been broadcast by one of the infrastructure equipment, and to perform an access class barring check on behalf of the one or more of the communications devices using the access class barring information, wherein the predetermined conditions comprise the communications device acting as the relay device determining that access is barred for the one or more of the communications devices.

Paragraph 13. A communications device acting as a relay device according to any of Paragraphs 1 to 12, configured to receive access class barring information, the access class barring information having been broadcast by one of the infrastructure equipment, and to perform an access class barring check on behalf of the one or more of the communications devices using the access class barring information, wherein the predetermined conditions comprise the communications device acting as the relay device determining that a probability of access being barred for the one or more of the communications devices for each access class potentially assigned to the one or more of the communications devices exceeds a predetermined threshold.

Paragraph 14. A communications device acting as a relay device according to any of Paragraphs 1 to 13, configured to receive access class barring information, the access class barring information having been broadcast by one of the infrastructure equipment, and to perform an access class barring check using the access class barring information, wherein the communications device acting as the relay device is in an idle mode, and wherein the predetermined conditions comprise the communications device acting as the relay device determining that access is barred.

Paragraph 15. A communications device acting as a relay device according to any of Paragraphs 1 to 14, wherein the predetermined conditions comprise the reception at the communications device acting as the relay device of an indication from one or more of the infrastructure equipment that the communications device acting as the relay device should not form new connections with one or more of the communications devices.

Paragraph 16. A communications device acting as a relay device according to any of Paragraphs 1 to 15, configured to transmit the indication bit to one or more of the infrastructure equipment.

Paragraph 17. An infrastructure equipment forming part of a mobile communications network configured to communicate with communications devices operating with the mobile communications network, the infrastructure equipment comprising transmitter circuitry configured to transmit signals to the communications devices, receiver circuitry configured to receive signals from the communications devices, and controller circuitry configured in combination with the receiver circuitry to receive from one of the communications devices acting as a relay device an indication bit, wherein the indication bit indicates whether the communications device acting as the relay device is able to form new connections with one or more of the other communications devices.

Paragraph 18. An infrastructure equipment according to Paragraph 17, wherein if the indication bit indicates that the communications device acting as the relay device is not able to form new connections with one or more of the other communications devices, the infrastructure equipment is configured to transmit an activation indication to one of the other communications devices, the activation indication indicating that the one of the other communications devices should act as a relay device.

Paragraph 19. An infrastructure equipment according to Paragraph 17 or Paragraph 18, configured to transmit to the communications device acting as the relay device an indication that the communications device acting as the relay device should not form new connections with one or more of the communications devices.

Paragraph 20. A communications device operating with a mobile communications network configured to communicate with other communications devices operating with the mobile communications network and infrastructure equipment forming part of the mobile communications network, the communications device comprising transmitter circuitry configured to transmit signals to the other communications devices and to transmit signals to the infrastructure equipment, receiver circuitry configured to receive signals from the other communications devices and to transmit signals to the infrastructure equipment, and controller circuitry configured in combination with the receiver circuitry to receive from one of the other communications devices acting as a relay device an indication bit, wherein the indication bit indicates whether the communications device acting as the relay device is able to form a new connection with the communications device.

Paragraph 21. A communications device according to Paragraph 20, wherein if the indication bit indicates that the communications device acting as the relay device is not able to form a new connection with the communications device, the communications device is configured to initiate a radio resource control connection establishment with one of the infrastructure equipment.

Paragraph 22. A communications device according to Paragraph 20 or Paragraph 21, wherein if the indication bit indicates that the communications device acting as the relay device is not able to form a new connection with the communications device, the communications device is configured to retain a pre-existing connection to the communications device acting as the relay device.

Paragraph 23. A communications device according to Paragraph 20 or Paragraph 21, wherein if the indication bit indicates that the communications device acting as the relay device is not able to form a new connection with the communications device, the communications device is configured to select another communications device acting as a relay device to form a connection with.

Paragraph 24. A communications device according to any of Paragraphs 20 to 23, configured to receive from the communications device acting as the relay device one or more further indication bits, the one or more further indication bits defining an access condition under which the communications device acting as the relay device is able to form a new connection with the communications device.

Paragraph 25. A method of operating a communications device acting as a relay device configured to communicate with communications devices operating with a mobile communications network and infrastructure equipment forming part of the mobile communications network, the method comprising determining whether predetermined conditions relating to the setting of an indication bit have been met, wherein the indication bit indicates whether the communications device acting as the relay device is able to form new connections with one or more of the communications devices, setting the indication bit dependent on the determination of whether the predetermined conditions have been met, wherein the communications device acting as the relay device is not able to form new connections with one or more of the communications devices when the predetermined conditions are met, and broadcasting the indication bit.

Paragraph 26. A method of operating an infrastructure equipment forming part of a mobile communications network configured to communicate with communications devices operating with the mobile communications network, the method comprising receiving from one of the communications devices acting as a relay device an indication bit, wherein the indication bit indicates whether the communications device acting as the relay device is able to form new connections with one or more of the other communications devices.

Paragraph 27. A method of operating a communications device operating with a mobile communications network configured to communicate with other communications devices operating with the mobile communications network and infrastructure equipment forming part of the mobile communications network, the method comprising receiving from one of the other communications devices acting as a relay device an indication bit, wherein the indication bit indicates whether the communications device acting as the relay device is able to form a new connection with the communications device.

Paragraph 28. Circuitry for communications device acting as a relay device configured to communicate with communications devices operating with a mobile communications network and infrastructure equipment forming part of the mobile communications network, the communications device acting as the relay device comprising transmitter circuitry configured to transmit signals to the communications devices and to transmit signals to the infrastructure equipment, receiver circuitry configured to receive signals from the communications devices and to receive signals from the infrastructure equipment, and controller circuitry configured in combination with the transmitter circuitry to determine whether predetermined conditions relating to the setting of an indication bit have been met, wherein the indication bit indicates whether the communications device acting as the relay device is able to form new connections with one or more of the communications devices, to set the indication bit dependent on the determination of whether the predetermined conditions have been met, wherein the communications device acting as the relay device is not able to form new connections with one or more of the communications devices when the predetermined conditions are met, and to broadcast the indication bit.

Paragraph 29. Circuitry for an infrastructure equipment forming part of a mobile communications network configured to communicate with communications devices operating with the mobile communications network, the infrastructure equipment comprising transmitter circuitry configured to transmit signals to the communications devices, receiver circuitry configured to receive signals from the communications devices, and controller circuitry configured in combination with the receiver circuitry to receive from one of the communications devices acting as a relay device an indication bit, wherein the indication bit indicates whether the communications device acting as the relay device is able to form new connections with one or more of the other communications devices.

Paragraph 30. Circuitry for a communications device operating with a mobile communications network configured to communicate with other communications devices operating with the mobile communications network and infrastructure equipment forming part of the mobile communications network, the communications device comprising transmitter circuitry configured to transmit signals to the other communications devices and to transmit signals to the infrastructure equipment, receiver circuitry configured to receive signals from the other communications devices and to transmit signals to the infrastructure equipment, and controller circuitry configured in combination with the receiver circuitry to receive from one of the other communications devices acting as a relay device an indication bit, wherein the indication bit indicates whether the communications device acting as the relay device is able to form a new connection with the communications device.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] LTE for UMTS: OFDMA and SC-FDMA Based Radio Access, Harris Holma and Antti Toskala, Wiley 2009, ISBN 978-0-470-99401-6.
[2] RP-151621, "New Work Item: NarrowBand IOT NB-IOT," Qualcomm, RAN #69.
[3] RP-160677, "Further Enhancements to LTE Device to Device, UE to Network Relays for IoT and Wearables," Qualcomm et al, RAN #71.
[4] RP-161839, "Revised SI: Further Enhancements LTE Device to Device, UE to Network Relays for IoT and Wearables," Huawei et al, RAN #73.
[5] S1-171438, "Relay selection criteria," InterDigital et al.
[6] S1-171439, "Relay selection criteria," InterDigital et al.
[7] TS 36.311, "Evolved Universal Terrestrial Radio Access (E-UTRA); Radio Resource Control (RRC); Protocol Specification," 3GPP.

What is claimed is:

1. A first communications device, the first communications device being configured to communicate with communications devices operating with a mobile communications network and infrastructure equipment forming part of the mobile communications network, the first communications device acting as a relay device for said communication devices in the mobile network, the first communications device comprising:

transmitter circuitry configured to transmit signals to the communications devices and to transmit signals to the infrastructure equipment;

receiver circuitry configured to receive signals from the communications devices and to receive signals from the infrastructure equipment; and controller circuitry configured in combination with the transmitter circuitry to:

determine whether predetermined conditions relating to the setting of an indication bit have been met, wherein the indication bit indicates whether the first communications device is able to form new connections between the first communications device and one or more of the communications devices in the mobile network;

set the indication bit dependent on the determination of whether the predetermined conditions have been met, wherein the first communications device is not able to form new connections between the first communications device and one or more of the communications devices in the mobile network when the predetermined conditions are met;

determine whether to adjust power consumption of the transmitter circuitry for forming the new connections between the first communications device and the one or more of the communications devices in the mobile network based on the predetermined conditions relating to the setting of the indication bit being met; and broadcast the indication bit along with (i) one or more synchronization signals to be used by communications devices to synchronize to the first communications device and (ii) a second indication bit that defines whether the first communications device is able to form new connections with one or more pre-configured communication devices or one or more predetermined device types, wherein the predetermined conditions comprise a quality of service that the first communications device is able to provide to the one or more of the communications devices is below a predetermined threshold.

2. The first communications device according to claim 1, wherein the predetermined conditions further comprise at least one of:

a battery level of the first communications device being below a predetermined threshold;

an overall power consumption of the first communications device exceeding a predetermined threshold;

a number of the communications devices which are currently connected to the first communications device being equal to or more than a predetermined number; or the reception at the first communications device of an indication from one or more of the infrastructure equipment that the first communications device should not form new connections with one or more of the communications devices; or the first communications device determining that a probability of access being barred for the one or more of the communications devices exceeds a predetermined threshold.

3. The first communications device according to claim 2, wherein determining that a probability of access being barred for the one or more of the communications devices exceeds a predetermined threshold is performed for each of one or more access classes potentially assigned to the one or more of the communications devices.

4. The first communications device according to claim 1, wherein the indication bit indicates that the first communications device is only able to form new connections with communications devices which have been pre-configured to connect to the first communications device.

5. The first communications device according to claim 1, wherein the indication bit indicates that the first communications device is only able to form new connections with communications devices of one or more predetermined types.

6. The first communications device according to claim 1, wherein the first communications device is in an idle mode.

7. The first communication device according to claim 1, further configured to:

receive access class barring information, the access class barring information having been broadcast by the infrastructure equipment, and perform an access class barring check, using the access class barring information, for the one or more of the communications devices, wherein the predetermined conditions comprise the first communications device determining that access is barred for the one or more of the communications devices.

8. A method of operating a communications device acting as a relay device configured to communicate with communications devices operating with a mobile communications network and infrastructure equipment forming part of the mobile communications network, the method comprising:

determining whether predetermined conditions relating to the setting of an indication bit have been met, wherein the indication bit indicates whether the first communications device is able to form new connections between the first communications device and one or more of the communications devices in the mobile network;

setting the indication bit dependent on the determination of whether the predetermined conditions have been met, wherein the first communications device is not able to form new connections between the first communications device and one or more of the communications devices in the mobile network when the predetermined conditions are met;

determining whether to adjust power consumption associated with forming the new connections between the first communications device and the one or more of the communications devices in the mobile network based on the predetermined conditions relating to the setting of the indication bit being met; and broadcasting the indication bit along with (i) one or more synchronization signals to be used by communications devices to synchronize to the first communications device and (ii) a second indication bit that defines whether the first communications device is able to form new connections with one or more pre-configured communication devices or one or more predetermined device types, wherein the predetermined conditions comprise a quality of service that the first communications device is able to provide to the one or more of the communications devices is below a predetermined threshold.

9. The method according to claim 8, wherein the predetermined conditions further comprise at least one of:

a battery level of the first communications device being below a predetermined threshold;

an overall power consumption of the first communications device exceeding a predetermined threshold;

a number of the communications devices which are currently connected to the first communications device being equal to or more than a predetermined number; or the reception at the first communications device of an indication from one or more of the infrastructure equipment that the first communications device should not form new connections with one or more of the communications devices; or the first communications device determining that a probability of access being barred for the one or more of the communications devices exceeds a predetermined threshold.

10. The method according to claim 9, wherein determining that a probability of access being barred for the one or more of the communications devices exceeds a predetermined threshold is performed for each of one or more access classes potentially assigned to the one or more of the communications devices.

11. The method according to claim 8, wherein the indication bit indicates that the first communications device is only able to form new connections with communications devices which have been pre-configured to connect to the first communications device.

12. The method according to claim 8, wherein the indication bit indicates that the first communications device is only able to form new connections with communications devices of one or more predetermined types.

13. The method according to claim 8, wherein the first communications device is in an idle mode.

14. The method according to claim 8, further comprising:

receiving access class barring information, the access class barring information having been broadcast by the infrastructure equipment, and performing an access class barring check, using the access class barring information, for the one or more of the communications devices, wherein the predetermined conditions comprise the first communications device determining that access is barred for the one or more of the communications devices.

* * * * *